Feb. 16, 1932.  F. FLEXON  1,845,654
GLASSWARE FORMING MACHINE MOLD AND MOLD CARRIER
Filed Feb. 26, 1929  2 Sheets-Sheet 1
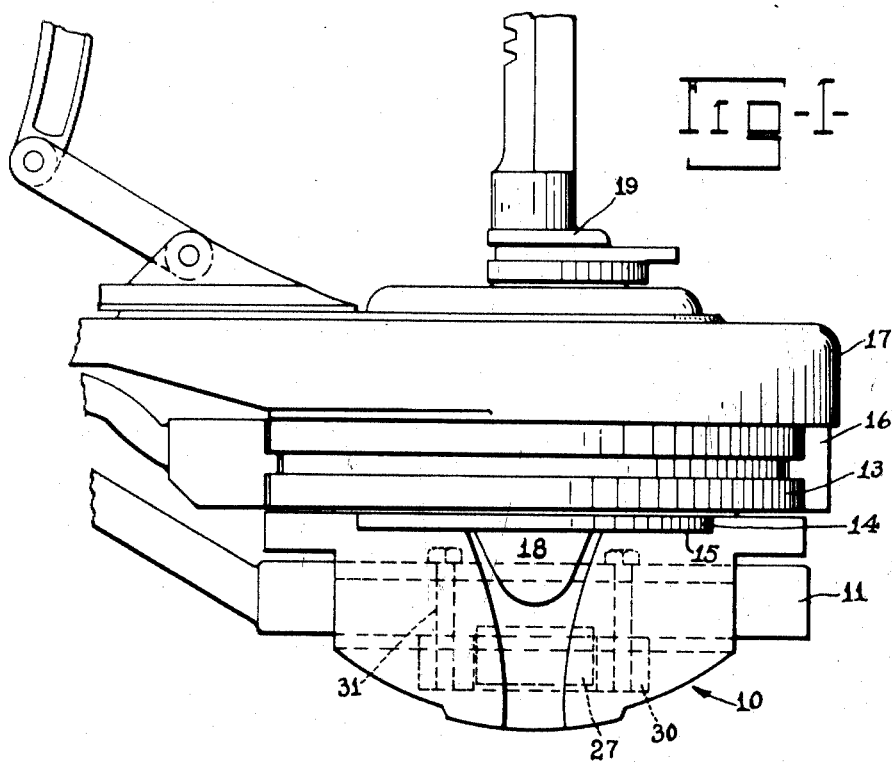
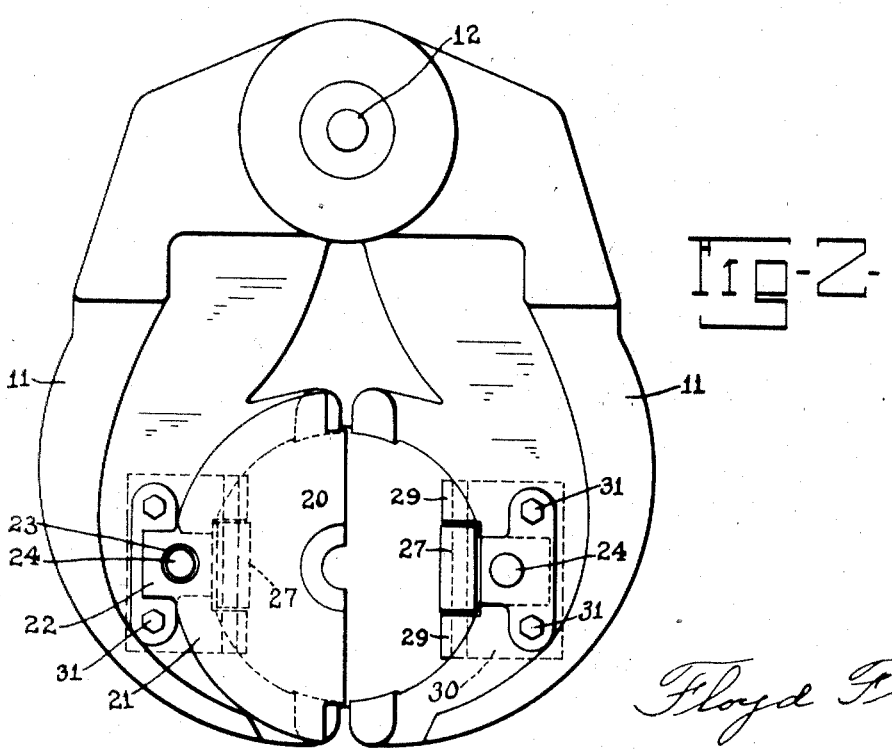

Feb. 16, 1932.    F. FLEXON    1,845,654
GLASSWARE FORMING MACHINE MOLD AND MOLD CARRIER
Filed Feb. 26, 1929    2 Sheets-Sheet 2
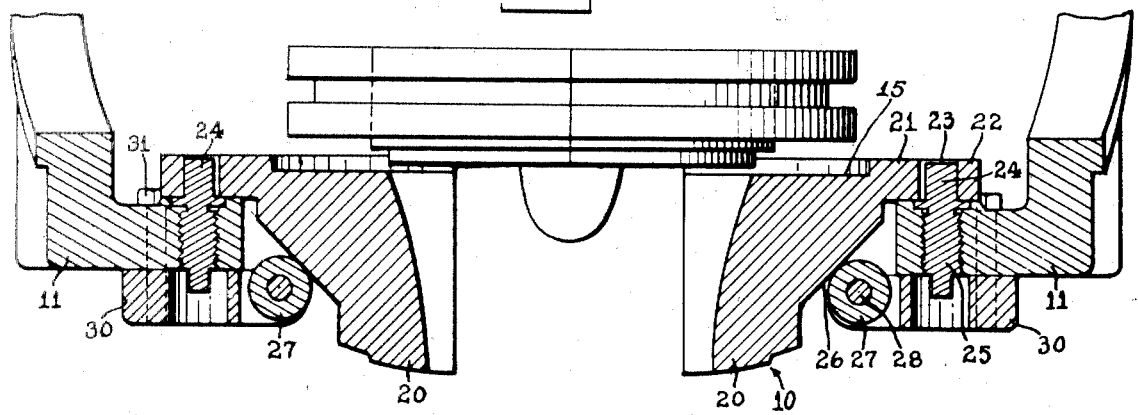
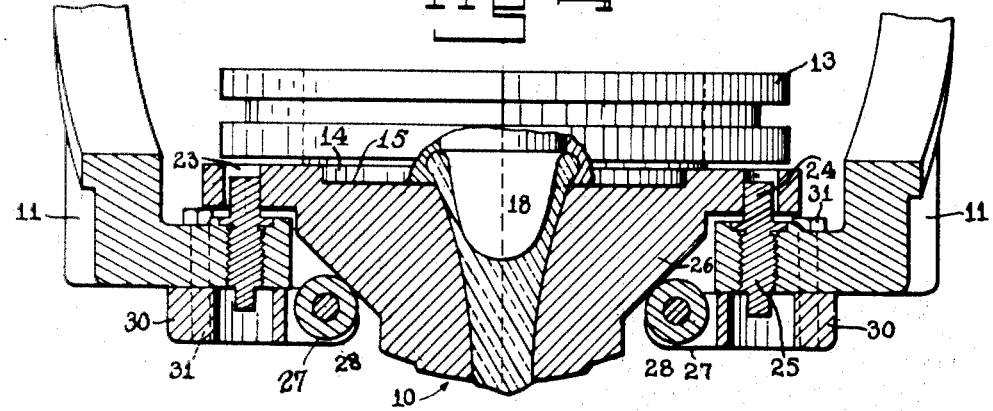
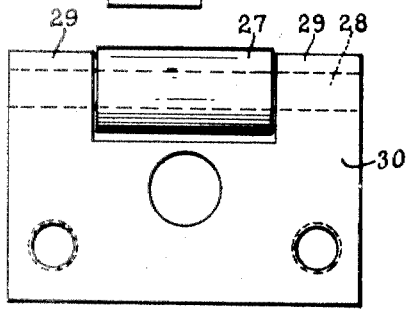
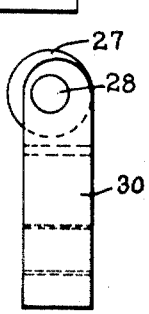
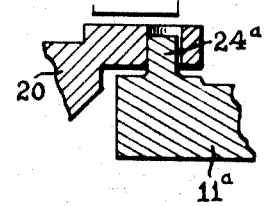
Inventor
Floyd Flexon
By J. F. Rule
Attorney Patented Feb. 16, 1932

1,845,654

UNITED STATES PATENT OFFICE

FLOYD FLEXON, OF FAIRMONT, WEST VIRGINIA, ASSIGNOR TO OWENS-ILLINOIS GLASS COMPANY, OF TOLEDO, OHIO, A CORPORATION OF OHIO

GLASSWARE FORMING MACHINE MOLD AND MOLD CARRIER

Application filed February 26, 1929. Serial No. 342,883.

The present invention relates to improvements in machines for forming hollow glassware and more particularly to the molds and mold carriers.

In that type of machine wherein the body molds comprise two half sections movable periodically into cooperative relation with the neck molds, it is standard practice to bring the body mold sections together by moving them horizontally across and in contact with the lower faces of the neck molds. These meeting faces are thus subjected to considerable wear and as a result permit leakage of blowing air and prevent maintenance of proper vacuum conditions in the molds. Because the opening and closing movements of the body mold follow a true horizontal path in closing about the corresponding neck mold, extremely accurate measuring and setting of the various mechanisms is necessary to obtain proper vacuum and air pressure conditions even when the molds and associated parts are first assembled.

An object of the present invention is to avoid the objections above noted by preventing sliding contact between the meeting surfaces of the blank and neck molds, for example, during movement of a blank mold into cooperative relation with the neck mold. To this end the construction is such that the blank mold sections are brought together, while spaced downwardly from the adjacent neck mold, by horizontal movement of the blank mold supporting arms and then moved axially upward into operative engagement with the neck mold or other mold with which it is adapted to cooperate.

Another object is to provide cam mechanism which operates immediately following closing of a mold to a position adjacent another mold to cause relative axial movement of the molds by which the meeting faces thereof are brought into snug contact with each other.

Other objects will be apparent hereinafter.

In the drawings:

Fig. 1 is a fragmentary side elevation showing my invention embodied in a charge gathering and blank forming unit.

Fig. 2 is a plan view of the blank mold carrier, one section of the blank mold being removed to disclose the cam roll upon which one of the mold sections rides.

Fig. 3 is a sectional elevation showing in detail the relative positions of the neck and blank mold during closing of the latter.

Fig. 4 is a view similar to Fig. 3 showing the blank mold closed and illustrating the relative positions of the blank mold sections and mold arms after said mold moves upwardly into contact with the neck mold.

Fig. 5 is an enlarged plan view of one of the cam rolls and its carrier.

Fig. 6 is an end elevation thereof: and—

Fig. 7 is a sectional view of a modification in which the guide pins are formed integral with the mold arms.

In the drawings illustrating one embodiment of my invention I have shown a partible blank mold 10 carried by a pair of mold arms 11 (Fig. 2), pivoted to a vertical hinge pin 12, said arms being movable toward and away from each other to alternately open and close the mold. The neck mold 13 is formed with an extension 14 on its lower end adapted to project into a circular recess 15 in the upper end of the blank mold 10 when the latter is closed. This neck mold 13 is formed in two sections carried by supporting arms 16. A blow head 17 of any approved type engages the upper surface of the neck mold when the latter is closed. A plunger 18 connected to a plunger carrier 19 is adapted to project into the neck and blank mold cavities at regular time intervals. The above is standard construction.

Each section 20 of the blank mold (Figs. 2 and 3) is formed with a horizontal flange 21 extending radially outward from its upper end. Midway the length of each flange 21 is a finger or lug 22 extending horizontally outward therefrom and formed with an opening 23 extending vertically therethru. This opening 23 slidingly receives a guide pin 24 carried by one of the mold arms 11 as shown in Figs. 3 and 4. This guide pin 24 is of less diameter than the corresponding opening 23 to permit relative horizontal movement of the mold sections and arms during upward movement of the former. This pin 24 is formed with a shank 25 threaded into a vertical opening in the mold arm and providing means whereby the guide pin may be replaced quite readily. The outer wall of each mold section is formed with an inclined cam face 26 which rests upon a cam roll 27. This cam roll is journaled on a horizontal pin 28 (Figs. 3 to 6 inclusive) mounted in arms 29 on a bracket 30. This bracket is attached to the lower side of the mold arm 11 by means of bolts 31 or similar fasteners. The above description applies to both mold sections and the supporting means therefor.

In operation, the neck mold 15 is closed and at a predetermined point thereafter the blank mold is brought into cooperative relation to the neck mold. In accordance with the present invention the closing of the blank mold and movement of the same into engagement with the neck mold require two distinct movements on the part of the blank or body mold. The mold arms 11 which carry the mold sections 20 are moved horizontally inwardly to thereby bring the blank mold sections together. This is accomplished without contact between the adjacent horizontal surfaces of the blank and neck molds with the result that wearing of these surfaces is avoided. Continuation of the inward movement of the mold arms 11 causes the mold sections 20 to move upwardly over the cam rolls 27. Thus the blank mold is moved axially and effects exceptionally snug contact between the meeting faces of the neck and blank molds. Clearance between the guide pins and their openings allows slight inward movement of the arms 11 relative to the mold 10. Incidentally such upward movement on the part of the blank mold 10 causes relative vertical movement between the mold arms 11 and sections 20 supported thereon. Lateral displacement of the mold sections 20 is prevented by the guide pins 24.

In Fig. 7 the guide pins 24ª are shown as being formed integral with the mold arm 11ª. This construction may be employed in place of the removable guide pins 24 shown in Figs. 3 and 4.

The construction described above provides for practical elimination of air pressure and vacuum leaks at the joints and between the meeting faces of the molds and avoids wear heretofore resulting from sliding contact between the adjacent surfaces of the mold.

Modifications may be resorted to within the spirit and scope of the appended claims.

What I claim is:

1. In combination, a neck mold, a partible body mold adapted to close to a position in which it is axially aligned with and spaced below the neck mold, means operable by a continuous movement to close the body mold, and mechanism actuated by a continuation of said movement of the mold closing means, to then move the body mold axially into cooperative relation with the neck mold.

2. In combination, a blow head, a neck mold therebeneath, a partible body mold adapted for cooperation with said blow head and neck mold, and an actuating device operable by a single movement to close the body mold by a horizontal movement of the mold sections to a position in which it is axially aligned with and spaced below the neck mold and means operated by a continued movement of said actuating device to then impart upward movement to the body mold and thereby cause contact between the latter and the neck mold and press the neck mold upwardly against the blow head.

3. In combination, a blow head, a neck mold therebelow, a partible body mold, cams, and actuating means to move the sections of the body mold horizontally together to a position below and in axial alignment with the neck mold, said actuating means operating through said cams after said positioning of the body mold to move the latter upwardly into engagement with the neck mold and in turn cause snug contact between the neck mold and blow head.

4. In combination, a neck mold, a partible blank mold adapted to cooperate with the lower side of the neck mold, a pair of mold arms hinged together for horizontal movement toward and away from each other, said arms carrying the sections of the blank mold, and means whereby movement of the arms toward each other beyond a predetermined point causes upward movement of the blank mold into contact with the neck mold.

5. In combination, a neck mold, a partible blank mold adapted to cooperate with the lower side of the neck mold, a pair of mold arms hinged together for horizontal movement toward and away from each other, said arms carrying the sections of the blank mold, means whereby movement of the arms toward each other beyond a predetermined point causes upward movement of the blank mold into contact with the neck mold, said means including a cam roll on each mold arm, and an inclined cam surface on each mold section resting upon one of said cam rolls.

6. In combination, a neck mold, a partible blank mold arranged below the neck mold, a pair of mold arms hinged together for horizontal swinging movement toward and away from each other, the sections of the blank mold being mounted on the arms and brought together by the inward movement of the arms, said mold sections being free to move vertically on said arms, and arm means operable by the inward movement of the mold arms beyond the mold closing point to move the blank mold axially relative to the arms into operative engagement with the neck mold.

7. In combination, a blow head, a neck mold, a partible blank mold, a pair of hinged arms carrying the blank mold sections, said arms movable to alternately open and close the blank mold, and means whereby continued movement of the arms after closing of the blank mold moves the latter upwardly into contact with the neck mold and in turn increases the upward pressure of the neck mold against the blow head.

8. In a glassware forming machine, a partible mold, mold arms supporting the sections of the mold and movable to alternately open and close the mold, and means whereby a continuation of the mold closing movement of the arms beyond a predetermined point causes vertical movement of the mold along a path substantially at right angles to the path followed by the mold arms.

9. In combination, a pair of mold arms, a pair of mold sections mounted for vertical movement on the arms, said arms movable toward each other to bring the mold sections together, and cam means operable by movement of the arms to lift the mold sections as a unit after they have been brought together.

10. In combination, a pair of mold arms, a pair of mold sections mounted for vertical movement on the arms, said arms movable toward each other to bring the mold sections together, cam means operable by movement of the arms to lift the mold sections as a unit after they have been brought together, said cam means including a cam roll on each mold arm, and an inclined cam on each mold section contacting with a cam roll.

11. In combination, a partible blank mold, arms supporting the blank mold sections, connection between the mold sections and their supporting arms whereby the mold sections may move vertically relative to the arms, brackets on the mold arms, and cam rolls mounted on said brackets for rotation about horizontal axes, said mold sections formed with inclined cam faces contacting said cam rolls.

Signed at Fairmont, W. V., this 20th day of February, 1929.

FLOYD FLEXON.